US007584034B2

(12) United States Patent
Kosugi

(10) Patent No.: US 7,584,034 B2
(45) Date of Patent: Sep. 1, 2009

(54) AUTOMOBILE DRIVE RECORDER

(75) Inventor: Tadatsugu Kosugi, Sagamihara (JP)

(73) Assignees: Akira Suzuki, Saitama-ken (JP); Chimee Park, Hyogo-ken (KR)

( * ) Notice: Subject to any disclaimer, the term of this patent is extended or adjusted under 35 U.S.C. 154(b) by 791 days.

(21) Appl. No.: 11/361,635

(22) Filed: Feb. 24, 2006

(65) Prior Publication Data

US 2007/0067079 A1 Mar. 22, 2007

(30) Foreign Application Priority Data

Sep. 20, 2005 (JP) ............................. 2005-271436

(51) Int. Cl.
*B60W 30/08* (2006.01)

(52) U.S. Cl. ......................... 701/35; 348/148; 340/436; 340/438

(58) Field of Classification Search .................... 701/35
See application file for complete search history.

(56) References Cited

U.S. PATENT DOCUMENTS

| | | | | |
|---|---|---|---|---|
| 3,508,238 | A * | 4/1970 | Baker | 340/551 |
| 5,382,953 | A * | 1/1995 | Hauptli | 340/937 |
| 5,510,764 | A * | 4/1996 | Hauptli | 340/433 |
| 5,640,156 | A * | 6/1997 | Okuda et al. | 340/928 |
| 7,030,778 | B2 * | 4/2006 | Ra | 340/937 |
| 7,049,945 | B2 * | 5/2006 | Breed et al. | 340/435 |
| 2003/0236622 | A1 * | 12/2003 | Schofield | 701/216 |
| 2004/0113778 | A1 * | 6/2004 | Script et al. | 340/545.1 |
| 2005/0030179 | A1 * | 2/2005 | Script et al. | 340/545.1 |
| 2006/0152351 | A1 * | 7/2006 | Daura Luna et al. | 340/435 |

FOREIGN PATENT DOCUMENTS

| | | |
|---|---|---|
| JP | 05-094682 | 4/1993 |
| JP | 07-029344 | 1/1995 |
| JP | 11-183613 | 7/1999 |
| JP | 2000-6854 | 1/2000 |
| JP | 2001-63500 | 3/2001 |
| JP | 2003-203285 | 7/2003 |
| JP | 2005-57661 | 3/2005 |

OTHER PUBLICATIONS

Japanese Patent Office Action for corresponding Japanese Patent Application No. 2003-032882 dated Jan. 24, 2006.

* cited by examiner

*Primary Examiner*—Thomas G Black
*Assistant Examiner*—Shelley Chen
(74) *Attorney, Agent, or Firm*—Hoffmann & Baron, LLP

(57) ABSTRACT

In an automobile drive recorder, if a detection signal indicating an occurrence of an abnormal driving state is output by an abnormal state detection sensor, image data of a scene taken by a monitoring camera is recorded for a period with a particular length together with additional information associated with the driving state into a record memory as drive record data. The automobile drive recorder includes a magnetic sensor serving as the abnormal state detection sensor adapted to detect a magnetic field in a close region around the automobile, approaching vehicle detection means for detecting an abnormally approaching vehicle by detecting a change at a rate greater than a predetermined value in the signal level of the detection signal output by the magnetic sensor, and frame rate switching means for controlling the frame rate at which to record the image data.

11 Claims, 3 Drawing Sheets

AUTOMOBILE DRIVE RECORDER

BACKGROUND OF THE INVENTION

1. Field of the Invention

The present invention relates to an automobile drive recorder adapted to continuously take an image of a scene around an automobile by using a monitoring camera installed in the automobile, and, if a detection signal indicating an occurrence of an abnormal driving state is output by an abnormal state detection sensor, record image data of the scene for a period with a particular length around the time of the occurrence of the abnormal driving state, together with additional information associated with the driving state, into a record memory as drive record data.

2. Description of the Related Art

Japanese Unexamined Patent Application Publication No. 2000-6854 discloses an automobile drive recorder adapted to record image information output by a CCD camera and sensor information output by various kinds of sensors such as a speed sensor and an acceleration sensor into a random access memory while updating the data stored in the random access memory as required. If a shock sensor detects a shock to a driver's automobile, information recorded in the memory is transferred to a flash memory and further output via an encoder from an output terminal so that the information is played back. This allows it to store an image and sensor information for a period immediately before an occurrence of an accident and thus allows it to analyze a state in which the accident occurred. Japanese Unexamined Patent Application Publication No. 2003-203285 discloses a state recording apparatus including initial state recording means for recording a result of a test performed before a driving of an automobile is started, running state recording means for recording a running state of the automobile while updating the recorded data as required, accident detection means for detecting an occurrence of an accident by using a shock sensor, and accident state recording means for recording a state of the accident of the automobile. This state recording apparatus makes it possible to, if an accident occurs, determine the cause of the accident by analyzing recorded information indicating whether the automobile had a failure, the GPS information, and sound information captured via a microphone. Japanese Unexamined Patent Application Publication No. 2005-57661 discloses an accident recording system adapted to take an image of an outside scene and an image of the inside of an automobile when the automobile is being driven, capture a voice/sound in the inside of the automobile via a microphone, and transmit the image data and the voice/sound data to a recording server via a network. If an occurrence of an accident is detected by a shock sensor, recording of the data is continuously performed regardless of the driving state.

Japanese Unexamined Patent Application Publication No. 2001-63500 discloses an obstacle detection apparatus adapted to, instead of detecting a shock that an automobile receives, detect an approaching obstacle using an ultrasonic sensor and display an image of the obstacle approaching the automobile on a display screen to inform a driver of the presence of the approaching obstacle. Japanese Unexamined Patent Application Publication No. 11-183613 discloses an automobile radar apparatus that transmits a frequency-modulated radio wave signal and detects the distance to a target or the relative speed between an automobile and the target based on a signal reflected from the target.

However, in the techniques disclosed in Japanese Unexamined Patent Application Publication No. 2000-6854, Japanese Unexamined Patent Application Publication No. 2003-203285, and Japanese Unexamined Patent Application Publication No. 2005-57661, an image of an accident is recorded when some shock caused by the accident is actually detected, and thus it is difficult to record an image of an accident with a bicycle, a motorcycle, or a pedestrian or a small accident with another automobile, which does not impose a considerable shock on the automobile. Besides, in these techniques, an image of a dangerous state/situation that may result in an accident is not recorded, unless the dangerous state/situation actually results in an actual accident. Furthermore, it is impossible to analyze a usual driving state/condition to manage the driving state/condition of a driver.

On the other hand, in the technique disclosed in Japanese Unexamined Patent Application Publication No. 2001-63500 in which an ultrasonic sensor is used instead of a shock sensor, although it is possible to record an image of a state/situation that can cause an accident even when the state/situation does not result in an actual accident, an attenuation of an ultrasonic wave caused by rain or noise generated by a driver's automobile can cause a reduction in detection reliability. Another problem of this technique is that it takes a processing time to detect the distance and thus it is difficult to detect a target at a very close position. The radio wave radar disclosed in Japanese Unexamined Patent Application Publication No. 11-183613 also has a problem with detection of a target at a close position. Another problem of this technique is that a complicated circuit is needed.

SUMMARY OF THE INVENTION

In view of the above, it is an object of the present invention to provide an automobile drive recorder capable of continuously recording image data of a usual driving state and an unusual driving state of a small or serious accident, or a danger not leading to an accident.

To achieve the above object, the present invention provides an automobile drive recorder that works using the property of a magnetic material included in a vehicle structure. More specifically, in an aspect of the present invention, there is provided an automobile drive recorder adapted to continuously take an image of a scene around an automobile by using a monitoring camera installed in the automobile, and, if a detection signal indicating an occurrence of an abnormal driving state is output by an abnormal state detection sensor, record image data of the scene for a period with a particular length around the time of the occurrence of the abnormal driving state, together with additional information associated with the driving state, into a record memory as drive record data, the automobile drive recorder including a magnetic sensor serving as the abnormal state detection sensor adapted to detect a magnetic field in a close region around the automobile, approaching vehicle detection means for detecting an abnormally approaching vehicle by detecting a change at a rate greater than a predetermined value in the signal level of the detection signal output by the magnetic sensor, and frame rate switching means for, if an abnormally closely approaching vehicle is detected, switching the frame rate at which image data is recorded in a record memory from a normal low frame rate to a high frame rate and maintaining the high frame rate for a predetermined period.

In this automobile drive recorder, in the normal state, the image of a scene of a close region around the automobile is taken at a low frame rate is recorded. However, if the approaching vehicle detection means detects a change at a rate equal to or greater than the predetermined value in the detection signal output by the magnetic sensor designed to detect vehicles made of a magnetic material, the frame rate switching means switches the frame rate to the high frame rate so that image data is recorded at the high frame rate.

That is, the automobile drive recorder according to the present invention allows image data indicating a normal driving state to be recorded at the low frame rate that allows a reduction in the necessary storage capacity of the record memory. When an abnormally closely approaching obstacle such as a vehicle with magnetism is detected, the frame rate at which image data is recorded is switched to the high frame rate so that high-quality image data indicating a following driving state is recorded. Thus, it becomes possible to record image data indicating an accident regardless of whether a large shock to the automobile occurs in the accident. Use of the magnetic sensor makes it possible to easily detect an abnormally closely approaching obstacle with magnetism by analyzing the detection signal of the magnetic sensor using a simple circuit, even when the obstacle is at a very close location without being influenced by noise generated by the user automobile.

In the detection using the magnetic sensor, the approaching vehicle detection means may detect approaching of an obstacle to an abnormally close location by detecting a change in the detection signal of the magnetic sensor relative to the moving average taken over a period with a predetermined length. This makes it possible to detect only vehicles approaching at speeds different from the speed of the user automobile by using a simple circuit. The magnetic sensor may have a sensitivity sufficiently high to sense a magnetic field with a strength similar to the strength of a geomagnetic field so that even a small vehicle, such as a motorcycle or a bicycle, which includes only a small part made of a magnetic material and thus which can cause a small change in the ambient magnetic field, can also be detected.

The automobile drive recorder may further include a human body sensor in addition to the magnetic sensor as an additional abnormal state detection sensor, adapted to detect a human body at a location in a close region around the automobile, and the frame rate switching means may switch the frame rate in response to a detection signal output by the human body sensor. This makes it possible to record not only an image of an actual accident in which the user automobile collides with a human body but also an image of a dangerous state in which the automobile almost actually collides with a human body. When the user automobile stops at a pedestrian crossing or the like, the signal interruption means disables outputting of the detection signal from the human body sensors over a period from a predetermined time after the stop to a time at which the automobile restarts to move so that pedestrians passing in front of the automobile at rest are not detected as abnormally approaching objects. That is, useless detection of pedestrians passing in front of the automobile at rest is prevented, and thus recording of useless of image data in the memory is prevented. This also makes it easier to analyze the driving state/condition.

The additional information may include date/time information output by a clock, sensor information output by the abnormal state detection sensor, and sensor information output by one or more driving operation sensors adapted to detect a state of a driving operation performed by a driver, the driving operation sensors including at least an automobile speed sensor so that it becomes possible to analyze the driving state/condition in a further detail manner based on the additional information recorded together with the image data. The additional information may include position information output by a GPS receiver and indicating the position of the user automobile or the additional information may include sensor information output by one or more driving environment detection sensors adapted to detect driving environment conditions in an automobile room, the driving environment detection sensors including at least a temperature sensor so that it becomes possible to analyze the driving state/condition from further detailed information. That is, it becomes possible to analyze an actual accident, a dangerous state which may result in an accident, and an abnormal driving state caused not by an external obstacle but by a driver, in a further detailed manner taking into account the additional information including the date/time information, the information output by the abnormal state detection sensors and the driving operation detection sensors, the position information indicating the position of the user automobile, and the information output by the driving environment detection sensors.

The record memory may be capable of being cleared and may have a storage capacity that that allows it to store all drive record data at the low and high frame rates for a period until the record memory is cleared. The capability of clearing the record memory makes it possible to analyze the driving state/condition over the whole period from the data stored in the record memory with the particular storage capacity. The drive record data stored in the record memory may be processed so as to prevent the drive record data from being tampered with. The record memory may have a storage capacity that allows it to store all drive record data of continuous driving for at least 12 hours at the low and high frame rates. This makes it possible to check the driving state/condition in an efficient manner. Thus, for example, in taxi companies or delivery companies, it becomes possible to check and mange the driving state/condition of drivers at scheduled intervals.

DESCRIPTION OF THE PREFERRED EMBODIMENTS

Figure 1:
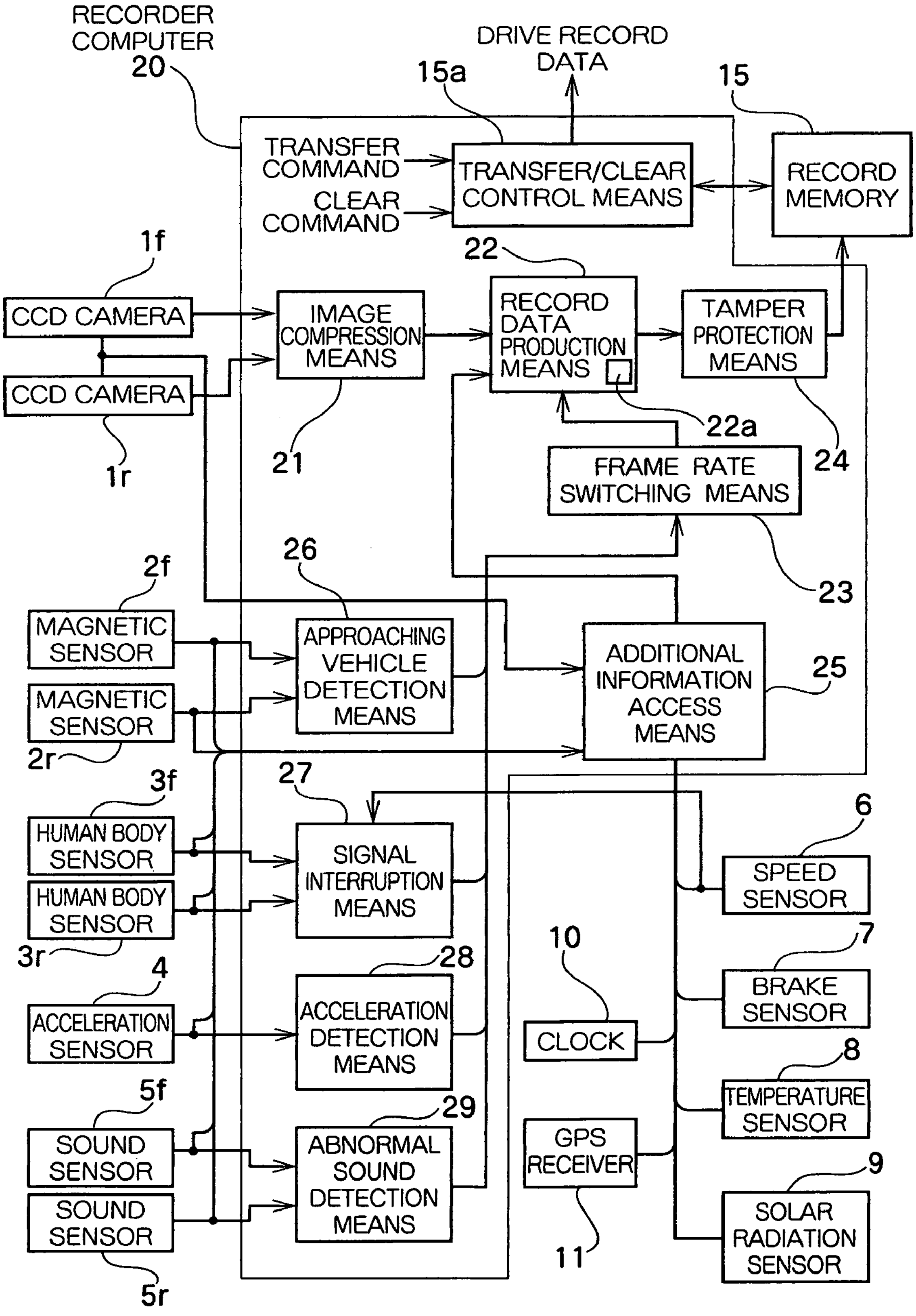
FIG. 1 is diagram showing a circuit of an automobile drive recorder according to an embodiment of the present invention.
Figure 2:
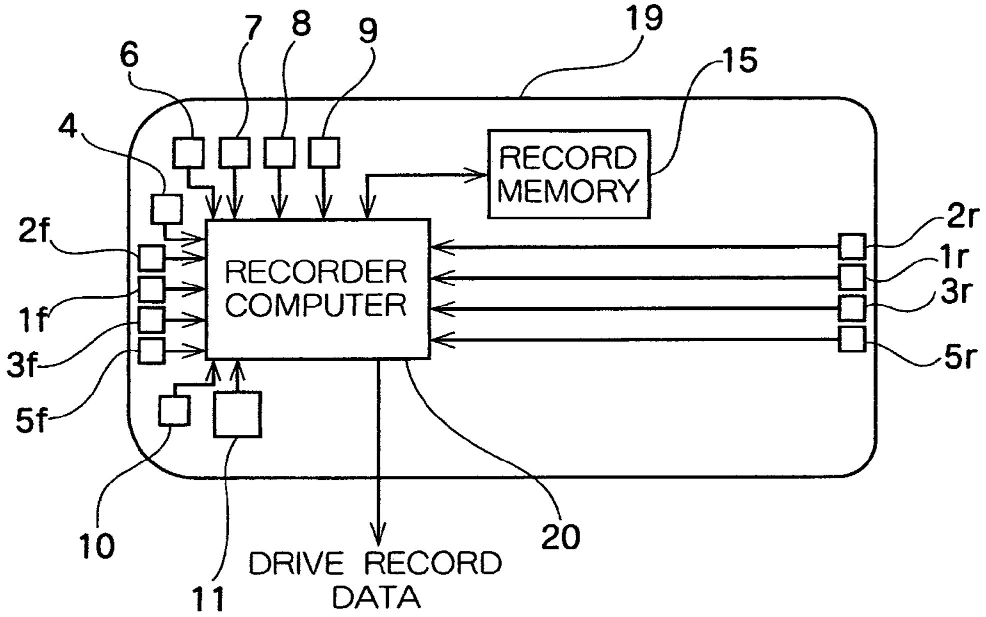
FIG. 2 is a diagram showing parts included in a recorder computer of an automobile drive recorder.
Figure 3:
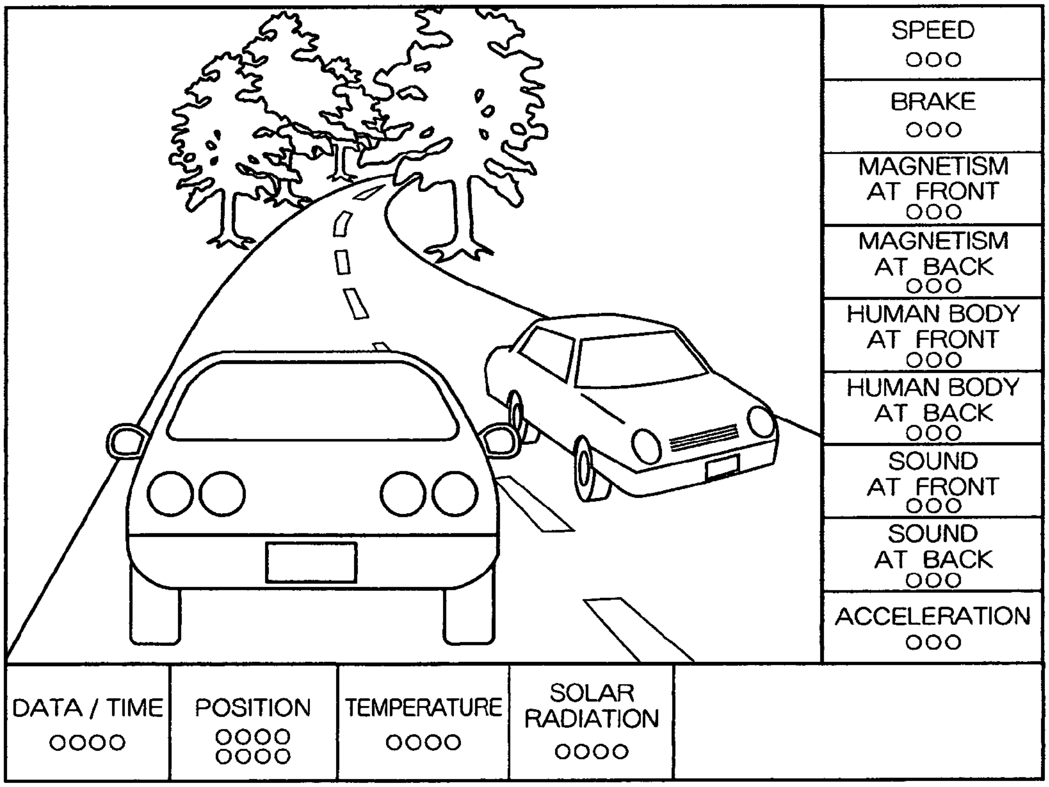
FIG. 3 is a diagram showing an example of one frame of image recorded by an automobile drive recorder.

Referring to FIGS. 1 to 4, an automobile drive recorder according to an embodiment of the present invention is described below. As shown in FIG. 2, the automobile drive recorder includes a recorder computer 20 installed in an automobile 19 and parts connected to the recorder computer 20. The parts connected to the recorder computer 20 include a recording memory 15, CCD cameras 1*f* and 1*r* serving as monitoring cameras disposed in the front and the back of the automobile 19, magnetic sensors 2*f* and 2*r* serving as a abnormal state detection sensor disposed in the front and the back of the automobile 19, human body sensor 3*f* and 3*r* disposed in the front and the back of the automobile 19, a acceleration sensor 4, microphones serving as sound sensors 5*f* and 5*r* disposed in the front and the back of the automobile 19, driving operation sensors including an automobile speed sensor 6 that is also used for an automobile speed meter and a brake sensor 7 adapted to detect pressing of a brake pedal, driving environment sensors including a temperature sensor 8 adapted to detect the temperature in an automobile room and a solar radiation sensor 9 that also serves as a solar radiation sensor of an air conditioner, a clock 10 that output a date/time signal, and a car navigation GPS receiver 11 that detects the position of the automobile.

The recorder computer 20 operates a CPU or the like in accordance with various kinds of programs stored in a program memory disposed in the recorder computer 20 to realize various kinds of means shown in FIG. 1, that is, image compression means 21 for compressing image data captured by the CCD cameras 1*f* or 1*r* such that the number of pixels of image data is reduced by a factor of a few tens, record data production means 22 for producing record data in a particular format by capturing the image data and combining it with additional information, frame rate switching means 23 for, when an abnormal state is detected, switching a frame rate at which image data is captured from a normal frame rate (for example, 0.5 frames/sec) to a high frame rate (for example, 10 frames/sec) and maintaining the high frame rate for a predetermined period (for example 10 sec), tamper protection means 24 for embedding a digital watermark into the record data, additional information access means 25 for accessing the afore-mentioned kinds of sensor information and date/time information and latitude/longitude information output by the GPS receiver, thereby producing a group of additional information, approaching vehicle detection means 26 for detecting an abnormally approaching vehicle such as an automobile, a motorcycle and a bicycle by detecting a change at a rate greater than a predetermined value in the signal level of the detection signal output by the magnetic sensor 2*f* or 2*r*, signal interruption means 27 for interrupting transmission of the detection signal of the human body sensors 3*f* and 3*r* to the frame rate switching means 23 for a period from a few seconds after stopping of the automobile to a time at which the automobile restarts to move, acceleration/deceleration detection means 28 for detecting abnormal acceleration or deceleration of the user automobile by detecting an increase in the absolute value of a positive or negative value of the detection signal output from the acceleration sensor 4 to a level higher than a predetermined value, abnormal sound detection means 29 for detecting an abnormal sound by detecting an increase in the detection signal output by the sound sensor 5*f* or 5*r* to a level higher than a predetermined value, and transfer/clear means 15*a* for, in response to a transfer command, reading data recorded in the record memory 15 and transferring the read data to a server memory of a management center and also for, in response to a clear command, clearing the content of the record memory 15 in preparation to store next data.

It is assumed that the magnetic sensors 2*f* and 2*r* have sensitivity sufficiently high to sense a magnetic field with strength similar to the strength of a geomagnetic field. Although the magnetic flux density of the geomagnetism tends to increase with the latitude, the magnetic flux density is about 50 μT (Tesla) or 50,000 nT even in areas outside the Japanese Islands. In city areas, although the magnetic flux density of the geomagnetism can vary by up to 10 μT depending on environmental conditions, there is substantially no change in the magnetic flux density when the automobile is at rest. As a magnetic sensor having sufficiently high sensitivity to detect such an order of a magnetic flux density, a semiconductor Hall device or an amorphous magnetic impedance device can be used. A GMR with very high sensitivity and high directivity, which has recently become available, can also be used.

In general, an automobile includes a large number of electrical components using a magnet, such as motors and sensors. An engine also includes parts using a magnet. As a result, a magnetic flux density of about 100 to 300 μT, which is greater than that of the magnetic flux density of the geomagnetism, is detected at a location 1 m apart from an automobile. In general, a magnetic material is in a slightly magnetized state, which causes a change in an ambient magnetic flux density. For example, in the case of bicycles, although they are smaller in size and weight than automobiles, magnetic materials used, for example, in their wheels can cause a change in the magnetic flux density at least by 10 μT of a normal geomagnetic field at a location 50 cm apart from a bicycle.

In a specific experimental example, when an ambient geomagnetic field and a peripheral magnetic field of the user automobile was detected by a semiconductor Hall device using a bridge circuit (model name HW-300B available from Ashahi Kasei Electronics Co., LTD) and amplified by a factor of 300, the resultant amplified output signal was 450 mV in amplitude. In this state, when a wheel portion of an arbitrary bicycle of plural types was placed at a location 50 cm apart, a change (an increase or a decrease depending on the polarity) of 60 mV or greater was observed in the amplitude of the amplified output signal. The change in the magnetic flux density includes a contribution of the concentration of the geomagnetic flux on a magnetic material, and thus a change in posture or location of the bicycle within a same degree of range does not result in a significant change in the magnetic flux density. When an automobile was placed at a location 50 cm apart, a change greater by a factor of several tens was observed in the amplified output signal. A large-sized truck caused a further greater change.

The approaching vehicle detection means 26 detects an abnormally approaching vehicle as follows. The amplified detection voltage signal of each of the magnetic sensors 2*f* and 2*r* having, as described above, sensitivity high enough to detect a magnetic field with a strength similar to that of the geomagnetic field is converted into digital form at a sampling rate of 1 msec, and the detection voltage is moving-averaged for a predetermined time period (for example, 5 sec). If a change greater than a predetermined threshold value (for example, 20 μT) in 0.5 sec (which can cause an automobile running at a speed of 20 km/hour to move about 1.5 m) is detected in the moving-averaged detection signal level, it is determined that there is an abnormally approaching automobile. Herein, taking into account the fact that the magnetic flux density of the geomagnetism is about 50 μT and the magnetic flux density of the geomagnetism can vary depending on environmental conditions, the threshold value is set to 20 μT which is slightly greater than the maximum variation in the magnetic flux density of the geomagnetism so that a approaching bicycle can be detected in a highly reliable manner. More specifically, when the moving average is calculated for $5\times10^3$ samples of the detection signal, if a change corresponding to 20 μT is detected in the detection signal of at least 10 samples within a period corresponding to first $5\times10^2$ samples of the $5\times10^3$ samples, it is determined that there is an abnormally approaching automobile. By detecting a change over a plurality of samples in the above-described manner, it becomes possible to prevent a sharp noise component from being incorrectly regarded as a signal indicating an abnormally approaching automobile.

When the user automobile stops at a traffic signal of a crossing, the user car gradually approaches another automobile located ahead at a very low speed. Therefore, the moving average gradually changes at a corresponding low rate and thus the approaching automobile located ahead is not detected as abnormal close approaching. This is also true for an automobile approaching the back of the user car. On the other hand, when an automobile approaches the user car at a relative speed higher than a threshold value from ahead or behind, the approaching automobile is detected when the relative distance becomes less than a few meters. In the case where there is an abnormally approaching motorcycle or bicycle with small magnetization, the approaching motorcycle or bicycle is detected when the relative distance becomes less than 50 cm. In the approaching vehicle detection means 26, the threshold value according to which to determine whether there is an abnormally approaching vehicle may be set properly depending on the required detection reliability and detection sensitivity. For example, when high detection sensitivity is needed to detect an approaching bicycle or the like, the threshold may be set to a value corresponding to a detection signal level change corresponding to, for example, 5 μT (that is, 1/10 of the magnetic flux density of the geomagnetism). Conversely, when it is desired to achieve a more reliable detection of an approaching automobile without being influenced by noise or a fluctuation in the magnetic flux density caused by environmental conditions, the threshold may be set to a value corresponding to 50 μT, although the result is a reduction in the sensitivity for approaching small automobiles such as a bicycle.

As for the human body sensors 3*f* and 3*r*, sensors using pyroelectoric effect and having a broad directivity, which operate using a change in surface charge caused by a change in temperature of a crystal due to incidence of an infrared ray from an approaching human body, such as those widely used to detect a person approaching a house, may be employed. The sensitivity of each of the human body sensors 3*f* and 3*r* is set so that a human body located within a range of 1.5 m is detected, by adjusting the internal circuit of each of the human body sensors 3*f* and 3*r*. As described above, the human body sensors 3*f* and 3*r* are associated with the signal interruption means 27 that disables of detection of human bodies of pedestrians when the user automobile is at rest at a stop signal. Note that the signal interruption means disables the detection of human bodies after a time delay of a predetermined length so that human bodies are detected during a time period with the predetermined length after the user automobile stops at a signal.

As for the acceleration sensor 4 and the sound sensors 5*f* and 5*r*, proper known sensors may be used. With the acceleration sensor 4 functioning not only as a sensor to provide additional information but also as an auxiliary abnormal state detection sensor, the acceleration/deceleration detection means 28 detects an abnormal driving state by detecting an positive or negative change in the detection signal to a level greater than a predetermined value due to an abrupt deceleration caused by a collision with a vehicle in front of the user automobile or caused by sudden braking or due to an abrupt acceleration caused by a collision from behind. Similarly, with the sound sensors 5*f* and 5*r* functioning not only as sensors to provide additional information but also as abnormal state detection sensors, the abnormal sound detection means 29 detects an abnormal sound such as a crashing sound, a screaming sound, or an abnormal sound caused by sudden stopping by detecting an increase in the detection signal output by the sound sensor 5*f* or 5*r* to a level greater than a predetermined value.

In synchronization with the imaging operation of the CCD cameras 1*f* and 1*r*, the additional information access means 25 accesses the detection signals output by the magnetic sensors 2*f* and 2*r*, the human body sensors 3*f* and 3*r*, the acceleration sensor 4, the sound sensors 5*f* and 5*r*, the automobile speed sensor 6, the brake sensor 7, the temperature sensor 8, and the solar radiation sensor 9, and the additional information access means 25 produces various sensor information indicating the respective detection signal levels in proper units. The additional information access means 25 further acquires the date/time signal output from the clock 10 and the latitude/longitude information output from the GPS receiver 11, and the additional information access means 25 produces additional information indicating the driving state/condition from the sensor information, the date/time signal, and the latitude/longitude information.

The record data production means 22 captures image data into the internal storage unit 22*a* at the high or low frame rate controlled by the frame rate switching means 23. The record data production means 22 also acquires the additional information at each time from the additional information access means 25 and produces record data in the format shown in FIG. 3 in the storage unit 22*a* while updating the record data as required. The tamper protection means 24 embeds an electronic watermark into the record data on a frame-by-frame basis and stores the resultant record data in the record memory 15.

The storage capacity of the record memory 15 is selected so as to allow record data to be continuously recorded, for example, for 12 hours. More specifically, for example, the record memory 15 has a storage capacity of 1 GB. If one frame of compressed image data with additional information including the electronic watermark has a data size of 40 KB and if the low frame rate is set to 0.5 frames/sec, the total data size of 12-hour record data becomes 864 MB. If the high frame rate is set to 10 frames/sec and if 10-sec recording at the high frame rate is performed 20 times to record abnormal states, the record data at the high frame rate has a data size of 80 MB, and thus the total data size is less than 1 GB. A wide variety of memory devices usable for this purpose are known. If desirable, the frame rate switching means 23 may be constructed so as to adaptively control the frame rate depending on a predicted driving time and/or the frequency of occurrences of abnormal states so that the record data has a data size less than a predetermined value or so that the limited storage capacity is used in an efficient manner.

Figure 4:
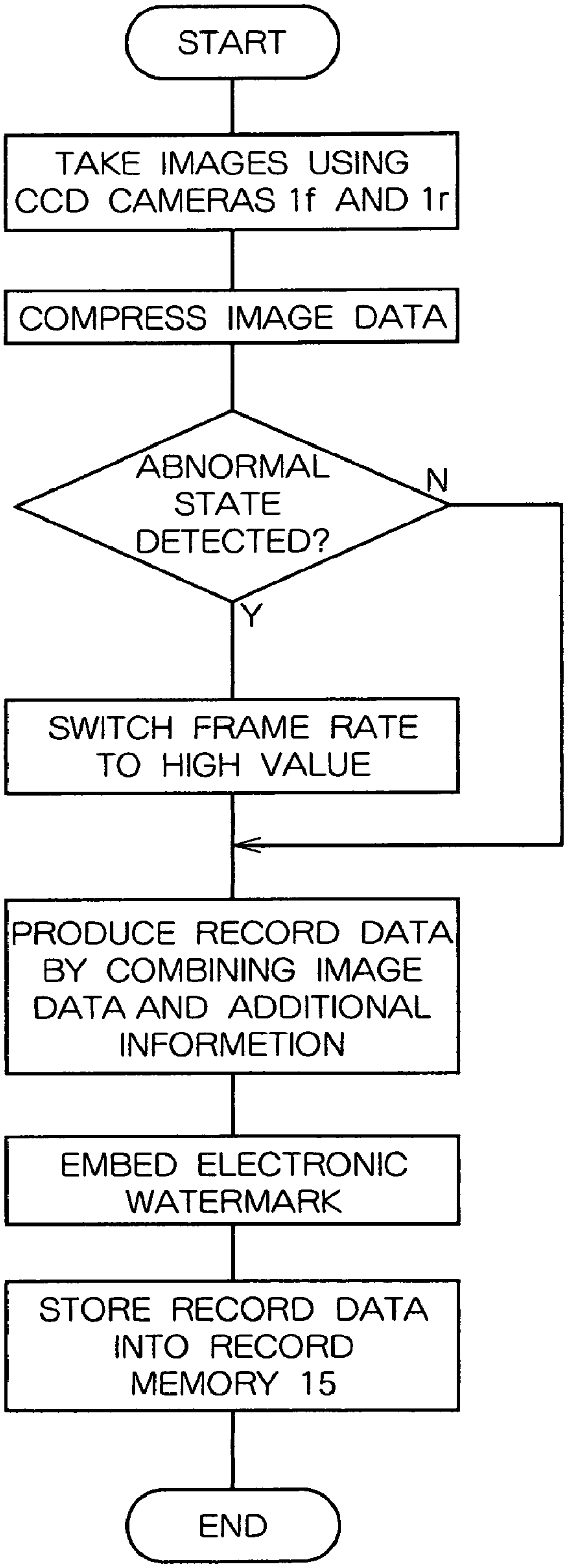
FIG. 4 is a flowchart showing an operation of an automobile drive recorder.

Now, referring to a flow chart shown in FIG. 4, the operation of the automobile drive recorder constructed in the above-described manner is described below. When the user automobile is running, the CCD cameras 1*f* and 1*r* take images of scenes respectively in front and back of the user automobile. The image data output from the CCD cameras 1*f* and 1*r* are compressed and combined with additional information. Furthermore, an electronic watermark is embedded into the image data and the resultant image data is sequentially stored into the record memory 15 so that all record data acquired during driving of the automobile is stored in the record memory 15.

The magnetic sensors 2*f* and 2*r* biased by the ambient magnetic field detects a change in the magnetic field caused by automobiles, motorcycles, or bicycles at close locations. If a change in the detection signal greater than the threshold value occurs at a rate greater than a predetermined value, it is determined that there is a vehicle abnormally approaching the user automobile, and image data is recorded at the high frame rate for a period with a predetermined length. As a result, image data of an actual crash, a small collision, or a dangerous state that could cause a collision but that did not result in an actual collision is recorded. Similarly, in response to detection of an approaching human body by the human body sensor 3*f* or 3*r*, image data is recorded at the high frame rate for a period with the predetermined length to record an image of a collision with a person or a dangerous state that could cause a collision but that did not result in an actual collision. When the user automobile stops at a pedestrian crossing, a useless detection of pedestrians is not performed, and thus useless recording at the high frame rate is avoided.

In a region including a special apparatus or a facility such as a train or a large transformer, the ambient magnetic field can increase to a very high level compared with the geomagnetic field. If the automobile runs in such a region having an extraordinarily high magnetic field, the detection signals output from the magnetic sensor 2*f* and 2*r* are saturated. This makes it impossible to detect an approaching obstacle having a part made of a magnetic material. On the other hand, in very rare cases, human bodies or clothes have a temperature equal to that of an environment such as a road, and it becomes impossible for the human body sensors 3*f* and 3*r* to detect an approaching human body. Even in such situations in which magnetic sensor 2*f* and 2*r* or the human body sensors 3*f* and 3*r* become unworkable, if an abrupt acceleration/deceleration or an abnormal sound is detected, recording is performed at the high frame rate in response to a detection signal of the abrupt acceleration/deceleration or the abnormal sound.

At the end of driving of the automobile each day, the drive record data in the record memory 15 is transferred to the server memory of the management center and the record memory 15 is cleared. The image data in the server memory is played back on a display screen to check the driving state/condition of each day. When the image data is displayed, the compressed image data is decompressed, and the electronic watermark is decoded to check whether the image data is tampered with. When an abnormal state such as a state in which an accident occurred is checked, the abnormal state is analyzed based on the additional information associated with the automobile speed and the braking or sensor information output by the four types of abnormal state detection sensors. If image data indicates an occurrence of an abnormal lateral deviation from a normal running path, a further check is performed based on the additional information indicating the automobile speed, the braking condition, the acceleration, and the like as to whether the driver dozes at the wheel or looked aside. On the other hand, if the acceleration sensor indicates an occurrence of sudden stopping of the automobile, the image data is checked to analyze the situation in which the sudden stopping occurred. When such an abnormal driving state is detected, effects of driving environmental conditions such as the temperature in the automobile room and the solar radiation may be analyzed.

Note that many alternative embodiments are possible. For example, in an alternative embodiment, additional sensors such as monitoring cameras, magnetic sensors, or human body sensors may be disposed on both sides of an automobile so that sensing is performed in all directions around the automobile. In another alternative embodiment, a Doppler sensor may be disposed on an automobile to detect an approaching speed of an obstacle and sensor information thereof may be recorded so that the approaching speed of an obstacle can be analyzed from this sensor information when the approaching speed cannot be determined from image data. In another alternative embodiment, a moisture sensor for detecting the moisture in the automobile room may be disposed as a driving environmental condition sensor and a steering wheel sensor may be disposed as a driving operation detection sensor. In another alternative embodiment, the microphone serving as the sound sensor may be used not only to detect the sound level but also to record a voice/sound itself. In another alternative embodiment, the tamper protection means for preventing driving record data from being tampered with may encrypt the driving record data or encrypting driving record data after an electronic watermark is embedded into the driving record data.

What is claimed is:

1. An automobile drive recorder adapted to continuously take an image of a scene around an automobile by using a monitoring camera installed in the automobile, and, if a detection signal indicating an occurrence of an abnormal driving state is output by an abnormal state detection sensor, record image data of the scene for a period with a particular length around the time of the occurrence of the abnormal driving state, together with additional information associated with the driving state, into a record memory as drive record data, the automobile drive recorder comprising:

a magnetic sensor serving as the abnormal state detection sensor adapted to detect a magnetic field in a close region around the automobile;

approaching vehicle detection means for detecting an abnormally approaching vehicle by detecting a change at a rate greater than a predetermined value in the signal level of the detection signal output by the magnetic sensor; and frame rate switching means for, if an abnormally approaching vehicle is detected, switching the a frame rate at which image data is recorded in a record memory from a normal low frame rate to a high frame rate and maintaining the high frame rate for a predetermined period.

2. The automobile drive recorder according to claim 1, wherein the approaching vehicle detection means determines whether an abnormal state has occurred, based on a change in the detection signal of the magnetic sensor relative to a predetermined-period moving average of the detection signal of the magnetic sensor.

3. The automobile drive recorder according to claim 1, wherein the magnetic sensor has a sensitivity sufficiently high to sense a magnetic field with a strength similar to the strength of a geomagnetic field.

4. The automobile drive recorder according to claim 1, further comprising a human body sensor in addition to the magnetic sensor as an additional abnormal state detection sensor, adapted to detect a human body at a location in a close region around the automobile, wherein the frame rate switching means switches the frame rate in response to a detection signal output by the human body sensor.

5. The automobile drive recorder according to claim 4, further comprising signal interruption means for interrupting transmission of the detection signal of the human body sensor during a period from a predetermined time after a stop of the automobile to a time at which the automobile restarts to move.

6. The automobile drive recorder according to claim 1, wherein the additional information includes date/time information output by a clock, sensor information output by the abnormal state detection sensor, and sensor information output by one or more driving operation sensors adapted to detect a state of a driving operation performed by a driver, the driving operation sensors including at least an automobile speed sensor.

7. The automobile drive recorder according to claim 1, wherein the additional information includes position information output by a GPS receiver and indicating the position of the automobile.

8. The automobile drive recorder according to claim 1, wherein the additional information includes sensor information output by one or more driving environment detection sensors adapted to detect driving environment conditions in an automobile room, the driving environment detection sensors including at least a temperature sensor.

9. The automobile drive recorder according to claim 1, wherein the record memory is capable of being cleared and has a storage capacity that that allows it to store all drive record data at the low and high frame rates for a period until the record memory is cleared.

10. The automobile drive recorder according to claim 1, wherein the drive record data stored in the record memory is processed so as to prevent the drive record data from being tampered with.

11. The automobile drive recorder according to claim 1, wherein the record memory has a storage capacity that allows it to store all drive record data of continuous driving for at least 12 hours at the low and high frame rates.

* * * * *

UNITED STATES PATENT AND TRADEMARK OFFICE

CERTIFICATE OF CORRECTION

PATENT NO. : 7,584,034 B2
APPLICATION NO. : 11/361635
DATED : September 1, 2009
INVENTOR(S) : Tadatsugu Kosugi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 861 days.

Signed and Sealed this

Fourteenth Day of September, 2010

David J. Kappos

*Director of the United States Patent and Trademark Office*